(12) United States Patent
Mandpe et al.

(10) Patent No.: US 10,394,873 B2
(45) Date of Patent: Aug. 27, 2019

(54) METHOD AND SYSTEM FOR GENERATING PHONETICALLY SIMILAR MASKED DATA

(71) Applicant: Tata Consultancy Services Limited, Mumbai (IN)

(72) Inventors: Ashvini Sakharam Mandpe, Pune (IN); Rahul Krushna Ghodeswar, Pune (IN); Ashim Roy, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 161 days.

(21) Appl. No.: 15/625,533

(22) Filed: Jun. 16, 2017

(65) Prior Publication Data

US 2017/0364523 A1 Dec. 21, 2017

(30) Foreign Application Priority Data

Jun. 18, 2016 (IN) .............................. 201621020922

(51) Int. Cl.
*G06F 16/35* (2019.01)
*G06F 16/33* (2019.01)
*G06F 17/27* (2006.01)
*G06F 16/30* (2019.01)

(52) U.S. Cl.
CPC ............ *G06F 16/355* (2019.01); *G06F 16/30* (2019.01); *G06F 16/3343* (2019.01); *G06F 17/2765* (2013.01)

(58) Field of Classification Search
CPC ............... G06F 16/355; G06F 16/3343; G06F 17/2765; G06F 16/30

USPC .......................................................... 707/738
See application file for complete search history.

(56) References Cited

U.S. PATENT DOCUMENTS

| 7,328,211 | B2 | 2/2008 | Bordner et al. |
| 7,769,726 | B2 | 8/2010 | Gitai et al. |
| 2008/0244389 | A1 | 10/2008 | Fux et al. |
| 2009/0132575 | A1* | 5/2009 | Kroeschel ............ G06F 21/6254 |
| 2009/0150370 | A1* | 6/2009 | Christensen ............ G06Q 10/10 |
| 2011/0153327 | A1* | 6/2011 | Iasso ....................... G10L 15/08 |
| | | | 704/243 |
| 2013/0060820 | A1* | 3/2013 | Bulusu ................ G06F 21/6254 |
| | | | 707/803 |

* cited by examiner

*Primary Examiner* — Cam Y T Truong
(74) *Attorney, Agent, or Firm* — Finnegan, Henderson, Farabow, Garrett & Dunner LLP

(57) ABSTRACT

A method and system is provided for generating a group of phonetically similar masked data. The present application provides a method and system for generating a group of phonetically similar masked data; comprises preprocessing of input dataset values comprising a list of fictitious data values to be used as masked data; determining a plurality of groups of phonetically similar data values present in the dataset list; and deriving metaphone for each input data value to be masked; generating a first numeric code from derived metaphone value of input data value to be masked; selecting one group of phonetically similar data values out of the plurality of groups of phonetically similar data values based on the generated first numeric code; and generating a second numeric code from input data value for selecting a masked value from a plurality of fictitious data group.

5 Claims, 2 Drawing Sheets

US 10,394,873 B2

METHOD AND SYSTEM FOR GENERATING PHONETICALLY SIMILAR MASKED DATA

PRIORITY CLAIM

This U.S. patent application claims priority under 35 U.S.C. § 119 to: India Application No. 201621020922, filed on Jun. 18, 2016. The entire contents of the aforementioned application are incorporated herein by reference.

TECHNICAL FIELD

This disclosure relates generally to data privacy and data masking in particular, and more particularly to method and system for generating a group of phonetically similar masked data.

BACKGROUND

Data Masking is one of the essential requirement in areas where customer sensitive information needs to be protected from unauthorized access. In data masking, the customer sensitive data is replaced with fictitious values before being shared for testing activities. At the same time, the masked output should maintain data variations, data distribution, data privacy, look and feel of original data, data integrity, and data consistency for flawless data testing. Data may also contain phonetically similar words which may sound same but are spelt differently. For an example, often multiple variations of a person's name are observed in such data due to data entry from multiple sources within an enterprise.

A majority of existing solutions relies on masking variations in input data with altogether different names. Resultant, the masked output will be unique, random or consistent. Some of the prior art literature vaguely describe about a masking system to mask phonetically similar data by replacing all the variants of input data with a same masked value; wherein the variance of original production data is removed by changing the data distribution post masking. However, prior art literature has never considering the variants of input data as a part of a single group, which are phonetically similar. In addition, prior art literature has never explored about masked output maintaining look and feel of original data including data variation by distributing the dataset value according to its phonetic properties.

In addition, the prior art literature requires to maintains a list of words and their phonetic equivalent, thus for any new data, the mapping has to be added in the list before processing the data. However, prior art literature has never explored eliminating need to maintain the map of original data and its metaphone, wherein the metaphone are generated at runtime, thus removing the possibility of backward traceability of original data. Prior art literature also restricts existing data masking systems to be executed only on file and voice. However, prior art literature has never explored extending the same to different data sources, such as RDBMS database, mainframe files, common files, log files, pdf, doc, docx etc. Prior art literature is also silent on providing combination of metaphone generation and masking of phonetically similar words for maintaining the integrity and consistency of data enterprise wide.

Prior art literature have illustrated various data masking tools and techniques, however, generating a group of phonetically similar masked data, wherein masked output maintains look and feel of original data including data variation is still considered as one of the biggest challenges of the technical domain.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for generating a group of phonetically similar masked data.

The present application provides a computer implemented method for generating a group of phonetically similar masked data, wherein said method comprises processor implemented steps of preprocessing of input dataset values comprising a list of fictitious data values to be used as masked data; determining a plurality of groups of phonetically similar data values present in the dataset list; and deriving metaphone for each input data value to be masked; generating a first numeric code from derived metaphone value of input data value to be masked; selecting one group of phonetically similar data values out of the plurality of groups of phonetically similar data values based on the generated first numeric code; and generating a second numeric code from input data value for selecting a masked value from a plurality of fictitious data group.

The present application provides a system (200) for generating a group of phonetically similar masked data; said system (200) comprising a processor; a data bus coupled to said processor; a computer-usable medium embodying computer code, said computer-usable medium being coupled to said data bus, said computer program code comprising instructions executable by said processor and configured for executing a standard metaphone generator module (202) adapted for preprocessing of input dataset values comprising a list of fictitious data values to be used as masked data; determining a plurality of groups of phonetically similar data values present in the dataset list; and deriving metaphone for each input data value to be masked; a first numeric code generation module (204) adapted for generating a first numeric code from derived metaphone value of input data value to be masked; a phonetically similar data values group selection module (206) adapted for selecting one group of phonetically similar data values out of the plurality of groups of phonetically similar data values based on the generated first numeric code; and a second numeric code generation module (208) adapted for generating a second numeric code from input data value for selecting a masked value from a plurality of fictitious data group.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
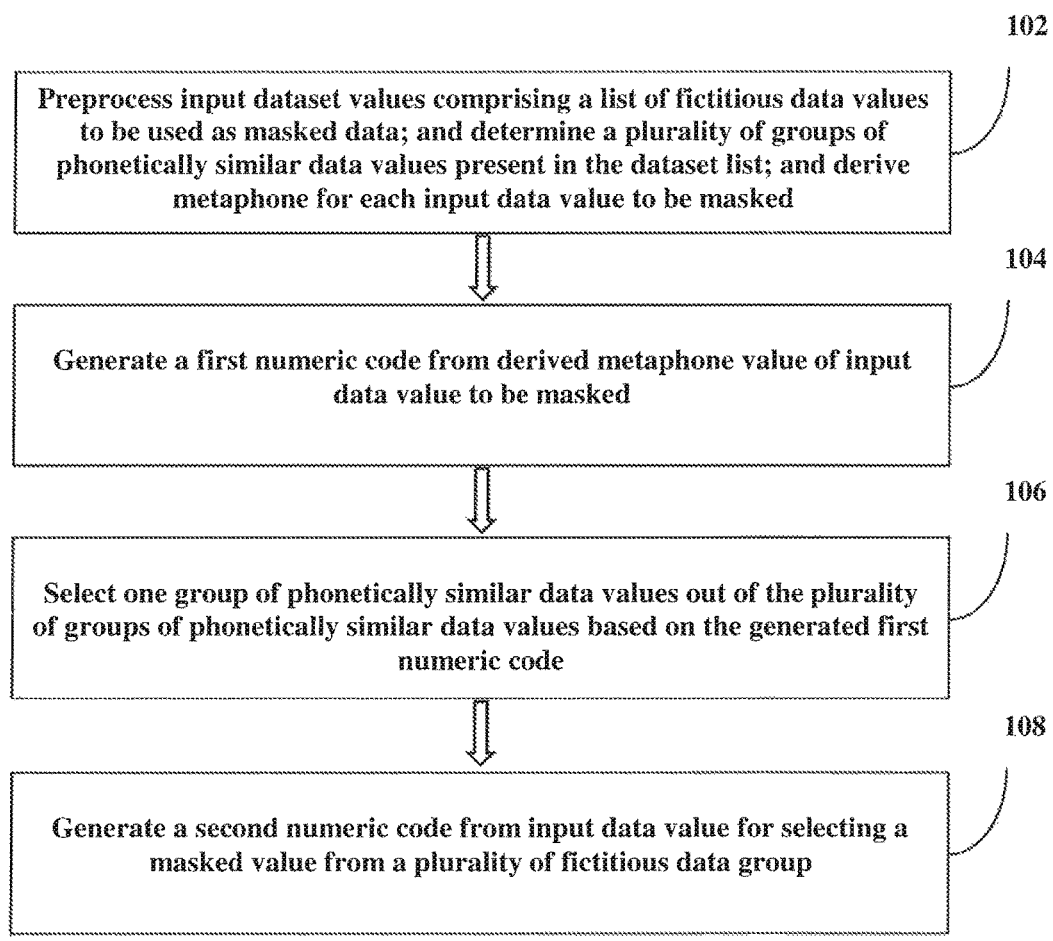
FIG. 1 shows a flow chart illustrating a method for generating a group of phonetically similar masked data.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

The present application provides a computer implemented method and system for generating a group of phonetically similar masked data.

Referring to FIG. 1 is a flow chart illustrating a method for generating a group of phonetically similar masked data.

The process starts at step 102, input dataset values are preprocessed comprising a list of fictitious data values to be used as masked data; a plurality of groups of phonetically similar data values present in the dataset list is determined; and metaphone for each input data value to be masked is derived. At the step 104, a first numeric code is generated from derived metaphone value of input data value to be masked. At the step 106, one group of phonetically similar data values is selected out of the plurality of groups of phonetically similar data values based on the generated first numeric code. The process ends at the step 108, a second numeric code is generated from input data value for selecting a masked value from a plurality of fictitious data group.

Figure 2:
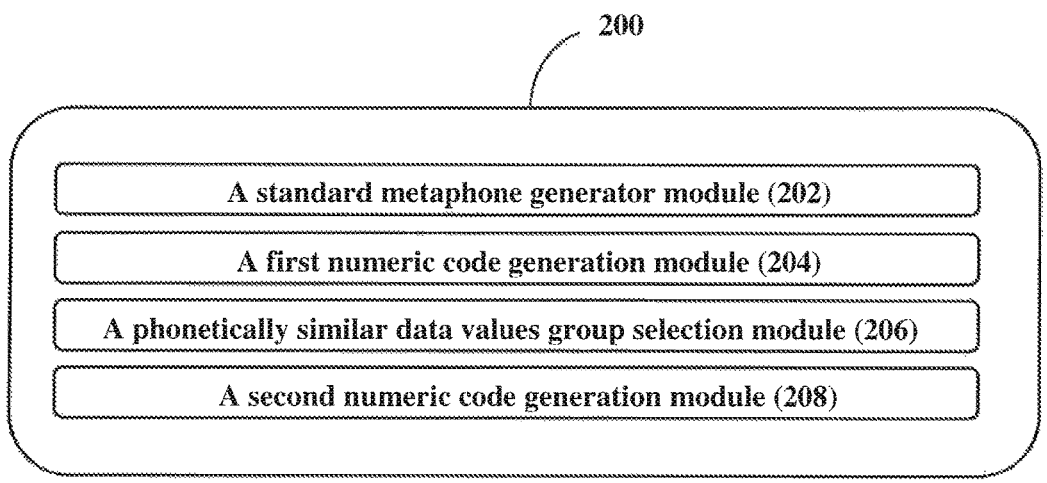
FIG. 2 shows a block diagram illustrating system architecture for generating a group of phonetically similar masked data.

Referring to FIG. 2 is a block diagram illustrating system architecture for generating a group of phonetically similar masked data.

In an embodiment of the present invention, a system (200) is provided for generating a group of phonetically similar masked data.

The system (200) for generating a group of phonetically similar masked data comprising a processor; a data bus coupled to said processor; a computer-usable medium embodying computer code, said computer-usable medium being coupled to said data bus, said computer program code comprising instructions executable by said processor and configured for executing a standard metaphone generator module (202); a first numeric code generation module (204); a phonetically similar data values group selection module (206); and a second numeric code generation module (208).

In another embodiment of the present invention, said standard metaphone generator module (202) is adapted for preprocessing of input dataset values comprising a list of fictitious data values to be used as masked data; determining a plurality of groups of phonetically similar data values present in the dataset list; and deriving metaphone for each input data value to be masked.

In another embodiment of the present invention, the first numeric code generation module (204) adapted for generating a first numeric code from derived metaphone value of input data value to be masked.

In another embodiment of the present invention, the phonetically similar data values group selection module (206) adapted for selecting one group of phonetically similar data values out of the plurality of groups of phonetically similar data values based on the generated first numeric code.

In another embodiment of the present invention, the second numeric code generation module (208) adapted for generating a second numeric code from input data value for selecting a masked value from a plurality of fictitious data group.

In another embodiment of the present invention, the method for generating a group of phonetically similar masked data further comprises of determining a group of masked output values from the plurality of fictitious data group by mapping the input data group to one of the data group in output.

In another embodiment of the present invention, the method for generating a group of phonetically similar masked data comprises of determining the group of masked out values from a pool of fictitious dataset list, further the input data group is mapped to one of the data group in output. The group of masked output values are utilized to fetch a consistent masked value for input data. For a particular group the masked output values group is consistent irrespective of occurrences of groups. For a particular input data, the masked output values from said determined group is consistent irrespective of its occurrences.

The present invention provides the method and system for generating a group of phonetically similar masked data, which is a combination of metaphone generation and masking of phonetically similar words for maintaining the integrity and consistency of data enterprise wide. The present invention considers the variants of input data as a part of a single group, which are phonetically similar. Thus, the masked output retains real time characteristics of original data by replacing variants of input data with different values which will also be variants of masked data value. The present invention also eliminates need to maintain the map of original data and its metaphone, wherein the metaphone are generated at runtime, thus removing the possibility of backward traceability of original data. The present invention extends the method and system for generating a group of phonetically similar masked data to different data sources, such as RDBMS database, mainframe files, common files, log files, pdf, doc, docx etc.

What is claimed is:

1. A method for generating a group of phonetically similar masked data, the method comprising processor implemented steps of:
   preprocessing, by using a standard metaphone generator module, input dataset values, wherein the input dataset values comprising a dataset list of fictitious data values to be used as masked data;
   determining, by using the standard metaphone generator module, a plurality of groups of phonetically similar data values present in the dataset list;
   deriving, by using the standard metaphone generator module, metaphone value for each input dataset value of the input dataset values to be masked;
   generating, by using a first numeric code generation module, a first numeric code from the derived metaphone value of the input dataset value to be masked;
   selecting, by using a phonetically similar data values group selection module, one group of the phonetically similar data values out of the plurality of groups of the phonetically similar data values based on the generated first numeric code;
   generating, by using a second numeric code generation module, a second numeric code from the input dataset value for selecting a masked value from a plurality of fictitious data groups; and
   determining, by the processor, a group of masked output values from the plurality of fictitious data groups by mapping one or more input data groups to one of the plurality of fictitious data groups, wherein the group of masked output values are utilized to fetch a consistent masked value for said each input dataset value, and wherein for a particular group of the groups, the group of masked output values is consistent irrespective of occurrences of one or more input data groups.

2. The method as claimed in claim 1, wherein for a particular input data, the masked output values from said determined group is consistent irrespective of its occurrences.

3. A system for generating a group of phonetically similar masked data, the system comprising:
   a processor;
   a data bus coupled to said processor; a computer-usable medium embodying computer code, said computer-usable medium being coupled to said data bus, said computer program code comprising instructions executable by said processor and configured for executing:
   a standard metaphone generator module configured for preprocessing input dataset values, wherein the input dataset values comprising a dataset list of fictitious data values to be used as masked data; determining a plurality of groups of phonetically similar data values present in the dataset list; and deriving metaphone value for each input dataset value of the input dataset values to be masked;
   a first numeric code generation module configured for generating a first numeric code from the derived metaphone value of the input dataset value to be masked;
   a phonetically similar data values group selection module configured for selecting one group of the phonetically similar data values out of the plurality of groups of the phonetically similar data values based on the generated first numeric code; and
   a second numeric code generation module configured for generating a second numeric code from the input dataset value for selecting a masked value from a plurality of fictitious data groups, wherein the processor determines a group of masked output values from the plurality of fictitious data groups by mapping one or more input data groups to one of the plurality of fictitious data groups, wherein the group of masked output values are utilized to fetch a consistent masked value for said each input dataset value, and wherein for a particular group of the groups, the group of masked output values is consistent irrespective of occurrences of one or more input data groups.

4. One or more non-transitory machine readable information storage mediums comprising one or more instructions which when executed by one or more hardware processors causes the one or more hardware processors to perform a method for generating a group of phonetically similar masked data, said method comprising:
   preprocessing, by a standard metaphone generator module, input dataset values, the input dataset values comprising a dataset list of fictitious data values to be used as masked data;
   determining, by using the standard metaphone generator module, a plurality of groups of phonetically similar data values present in the dataset list;
   deriving, by using the standard metaphone generator module, metaphone for each input dataset value of the input dataset values to be masked;
   generating, by using a first numeric code generation module, a first numeric code from the derived metaphone value of the input dataset value to be masked;
   selecting, by using a phonetically similar data values group selection module, one group of the phonetically similar data values out of the plurality of groups of the phonetically similar data values based on the generated first numeric code;

generating, by using a second numeric code generation module, a second numeric code from the input dataset value for selecting a masked value from a plurality of fictitious data groups; and determining, by using a hardware processor, a group of masked output values from the plurality of fictitious data groups by mapping one or more input data groups to one of the plurality of fictitious data groups, wherein the group of masked output values are utilized to fetch a consistent masked value for said each input dataset value, and wherein for a particular group of the groups, the group of masked output values is consistent irrespective of occurrences of one or more input data groups.

5. The one or more non-transitory machine readable information storage mediums of claim 4, wherein for a particular input data, the masked output values from said determined group is consistent irrespective of its occurrences.

* * * * *